Feb. 13, 1945. H. N. FAIRBANKS ET AL 2,369,448
SAFETY SHUTTER FOR MOTION PICTURE PROJECTORS
Filed March 3, 1942
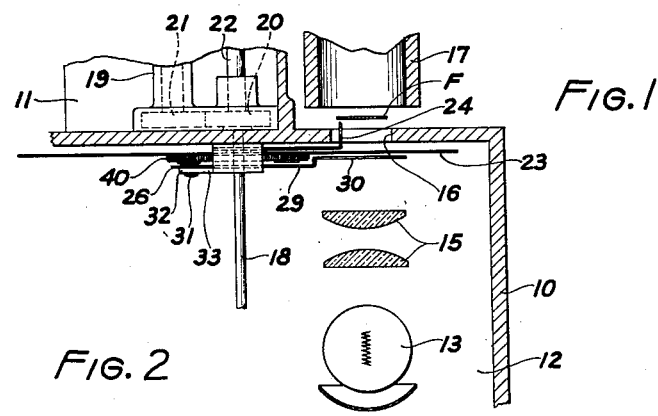
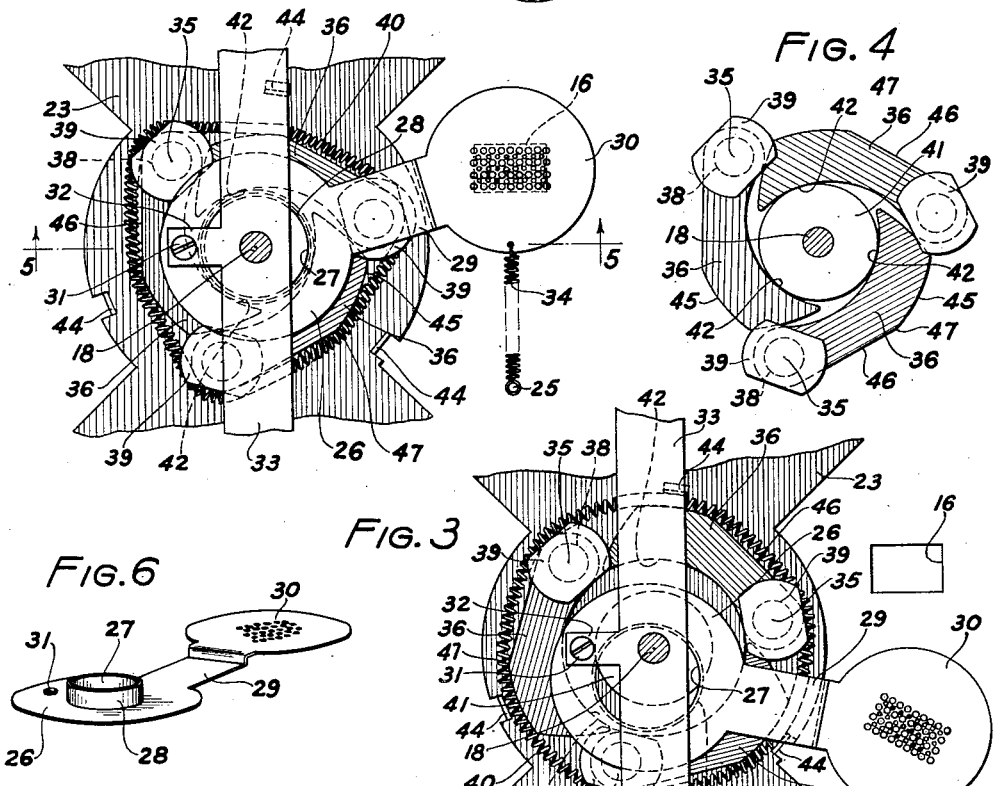
HENRY N. FAIRBANKS
VERNON H. JUNGJOHANN
INVENTORS
BY
ATTORNEYS Patented Feb. 13, 1945

2,369,448

UNITED STATES PATENT OFFICE 2,369,448

SAFETY SHUTTER FOR MOTION PICTURE PROJECTORS

Henry N. Fairbanks and Vernon H. Jungjohann, Rochester, N. Y., assignors to Eastman Kodak Company, Rochester, N. Y., a corporation of New Jersey Application March 3, 1942, Serial No. 433,168

6 Claims. (Cl. 88—19.4)

The present invention relates to a safety shutter for motion picture apparatus, and more particularly to a safety shutter which intercepts the light beam in projection types of motion picture apparatus and which is moved out of and into the light beam when surrounding circumstances attain predetermined conditions.

Particular care must be exercised in projecting a light beam through photographic film which has a cellulosic base, inasmuch as the intensity of the light beam for satisfactory projection of images on the film must be so great that the film is likely to become ignited. This source of danger has been recognized for a considerable time, and many different types of safety shutters have been devised which protect the film when stationary or traveling at slow speed, and which are automatically removed from the light beam when the travel of the film is increased to a degree that the film is in no danger of being ignited although exposed to the direct rays of the light source.

Known devices for effecting the movement of such a safety shutter are all more or less complicated and possess certain recognized disadvantages. One of the major faults of devices of this character is found in the jerky and not too sensitive manner in which they either move into or out of their operating positions. Also, an apparatus wherein specifically operated clutch means are relied upon as the means of moving the safety shutter to, and holding it in, an operative position the clutch parts are in constant frictional engagement during normal operation of the machine. This constant frictional engagement is not only undesirable from the standpoint of wear and noise incident thereto, but in addition, when the apparatus is operated near its critical speed the safety shutter has a tendency to flutter to and from an inoperative position instead of moving smoothly and directly from one position to another. Furthermore, in apparatus where the safety shutter is adapted to operate in either a forward or reverse movement of the projector, the safety shutter has to be arranged to move in both directions from an operative position and rely upon a counter-balancing arrangement to return it to its operative position. To overcome the undesirable pendulum action in safety shutter necessitated by such a counter-balance arrangement, more or less complicated arrangements for dampening such counter-balance action have been devised.

The primary object of the present invention is the provision of a simple but effective safety shutter which normally is moved from the light beam of a motion picture apparatus, and which is automatically moved out of said light beam when the film is moving at or above a predetermined speed.

Another object is the provision of a safety shutter which is operable during either a forward or reverse movement of the projecting mechanism and moves in the same direction from its operative position regardless of the direction of operation of the projection apparatus.

And still another object is the provision of a safety shutter which is normally moved from its operative position and is positively engaged and moved to its operative position by normally restrained weights which are arranged to overcome their restraining means and disengage the safety shutter under the influence of centrifugal force when the apparatus attains a predetermined speed.

A further object is to provide a safety shutter operating means such that there is no frictional contact of parts under normal operating conditions of the projection apparatus with the result that there is no wear or noise incident to such frictional contact. In addition, if frictional contact is not relied upon to move and hold the safety shutter in any position, there is no jerky or fluttering movement of the shutter incident to such an arrangement.

And yet another object is to provide a safety shutter operating means which is very responsive to changes in speed, and by means of which the safety shutter is moved directly and smoothly between its two positions.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawing in which:

Fig. 1 is a plan view of the safety shutter constructed in accordance with the present invention, and showing its location in the motion picture projector, portions of the projector casing being cross-sectioned for clear illustration of the safety shutter.

Fig. 2 is an elevational view of the safety shutter, showing the parts in the position they assume when the projection apparatus is operating below a predetermined speed and the safety shutter is in an operative position.

Fig. 3 is a view similar to Fig. 2, but showing the parts in the position they assume when the projection apparatus is operating at, or above, a predetermined speed and with the safety shutter in an inoperative position.

Fig. 4 is a detailed elevation of the safety shutter operating weights in the position they are in in Fig. 2, and intended to clearly show the form and manner of mounting the weights on the shutter so that their function will be clear to one reading the following description of the apparatus.

Fig. 5 is a sectional view taken substantially on line 5—5 of Fig. 2, and

Fig. 6 is a perspective view of the safety shutter member per se separate from the operating means therefor.

Like reference characters refer to corresponding parts throughout the drawing.

In the illustrated embodiment, the safety shutter is shown in conjunction with the known elements of the motion picture projector, however, it is to be understood that such a safety shutter may be used under any circumstances which require the projection of a stationary or slow moving film from the total direct rays of the light source.

Referring now to Fig. 1, the projector casing indicated broadly as 10 is made up of two parts, a mechanism chamber 11, and a lamphouse 12 within which a light source such as an incandescent lamp 13 is mounted. A condenser lens assembly 15 is located in alignment with a suitable aperture 16 in the wall of the projector housing, and in alignment with this aperture is the customary objective tube 17.

The shutter shaft 18 journaled in the gear housing 19 in the mechanism chamber 11 extends into the lamphouse 12, and may be driven in either direction of rotation through the gears 20 and 21 from the motor shaft 22. Fixed to the shutter shaft in any suitable manner is a disk shutter 23 which is adapted to intercept the light beam intermittently as is well known. Fixed to that portion of the shutter shaft directly behind the front wall of the lamp housing is an eccentric, not shown, which is adapted to engage an apertured film claw 24 in the customary manner to feed the film F past the aperture 16.

The elements thus far described are well known in the motion picture art and form no part of the present invention except insofar as they enter into combination with the parts of the apparatus to be described hereinafter.

Referring now to Fig. 6, the safety shutter per se comprises a circular body portion 26 having an aperture 27 which is encircled by a spun-up ring, or flange, 28, extending perpendicularly to the surface of the safety shutter. Extending radially from the body portion 26 is an arm 29 terminating in a heat screen 30 which is adapted to be moved into and out of the light beam, or into and out of covering relation with the aperture 16 in the projector wall. The heat screen may be either opaque, a screen consisting of a medium for reducing heat rays such as copper or heat dissipating screens, gold-plated glass, mica, perforated metal, as shown, or any well-known heat retarding material.

As clearly illustrated in Figs. 2–5, the safety shutter is assembled with a shutter shaft 18 extending through the aperture 27 in the body portion thereof, and with the ring, or flange 28 thereon extending toward the shutter 23, and with the heat screen 30 extending toward the aperture 16 in the projector wall. The body portion of the safety shutter is pivoted eccentrically of the shutter shaft 18 at 31 to an arm 32 integral with a U-shaped supporting strip 33 fixed to the rear of the projector wall in any suitable manner, see Figs. 1 and 5. It will be noticed that a portion of the U-shaped supporting strip 33 to which the safety shutter is pivoted is spaced from the opposed face of the shutter 23 so that the ring, or flange, 28 on the safety shutter does not engage the shutter.

The safety shutter is normally moved to an inoperative position, in which the heat screen is removed from covering relation with the aperture 16, by a spring 34, one end of which is fixed to the heat screen and the other end of which is fixed to a pin 25 on a stationary part of the apparatus, in addition to the force of gravity acting on the heat screen. Inasmuch as the force of gravity will always tend to move the safety shutter to its inoperative position, see Fig. 3, it will be readily understood that the spring 34 need only be a very light one. In fact, the spring 34 provides a supplement for the force of gravity and makes the safety shutter move quickly to its inoperative position when it is free to do so, and serves to overcome the effect of any friction that might tend to oppose normal movement of the safety shutter due to the force of gravity.

Pivotally mounted at one end 35 to the face of the shutter 23 opposed to the safety shutter are three weights 36, see Fig. 4. These weights are pivotally mounted on the shutter in concentric relation to the shutter shaft 18 whereby they are adapted not only to rotate with the shutter but are also adapted to swing outwardly from the shutter shaft under the action of centrifugal force when the shutter rotates. Each of the posts 38 on which the weights are pivoted includes a cap 39 which holds the weights on the posts and serve as guides for the swinging movement thereof. The free end of each of the weights 36 are each normally moved toward the shutter by a coil spring 40 which encircles the three posts 38, see Figs. 2 and 3, in which position the weights are held against the periphery of a raised circular boss 41 at the center of the shutter 23.

Referring to Fig. 5 it will be noticed that the curved inner faces 42 of each of the weights is wider than the boss 41 and overhangs the end of the ring, or flange, 28 and the body portion of the safety shutter. Thus, when the weights are moved to their normal, or inward, position, see Figs. 2 and 4, which they assume when the projector is stationary or is running below a predetermined speed, the inner faces of the two lowermost weights engage the ring 28 on the safety shutter and move the same to, and hold it in, an operative position, see Fig. 2. Referring to Fig. 5, it will be noticed that the diameter of the ring 28 on the safety shutter is slightly less than that of the boss 41 on the shutter 23. This particular relative size of these two parts is provided so that the weights will not squeeze the ring 28 when holding the safety shutter in its operative position in which case the weights would tend to carry the safety shutter in the direction of movement of the main shutter when the apparatus is coming up to speed.

When the projector is started the weights will move relative to the ring 28 on the safety shutter and hold the same in a central position until the projector attains a predetermined speed. At this instant, the free end of the weights will swing outwardly of the shutter shaft under the action of centrifugal force and will release the ring 28 so that the safety shutter can move to its normal inoperative position under the combined influence of gravity and the spring 34. Looking at Fig. 3, it will be noticed that in swinging outwardly the weights cause an expansion of the coil spring 40, and the strength of this spring in conjunction with the mass and arrangement of the weights is made to permit the weights to release the safety shutter at a predetermined speed of the apparatus.

The outward movement of the weights is limited by three stops 44 on the face of the shutter 23 against which the weights force the coil spring 40, see Fig. 3. It is important to note that in this position of the weights the inner faces 42 thereof are entirely free of the ring 28 on the safety shutter which engages the shutter shaft 23 to limit the downward movement of the safety shutter to its inoperative position. The advantage of this arrangement is that under normal operating conditions of the projector there is no frictional contact between the rotating weights and the stationary safety shutter and as a result there is no frictional wear of parts or noise incident to said frictional contact.

When the projector is operating at or above a predetermined speed, the parts assume the position shown in Fig. 3 wherein the safety shutter is moved to its normal inoperative position and the weights 36 are entirely free of the ring 28 thereon. Now, if the projector for any reason falls below said predetermined speed the force of the coil spring will overcome the centrifugal force acting to swing the weights outwardly and the springs will compress the weights inwardly so that the inner faces thereof will engage the ring 28 and pivot the safety shutter to its operative position, see Fig. 2.

It will be noticed that the outside edges of the free end of the weights 36 are formed with an arcuate portion 45 and a flat portion 46 the connecting points of the two forming a high point 47. This particular configuration of the outer edge of the weights is provided to give the most efficient operation of the coil spring 40. When the weights are at their innermost position it will be noticed that the spring engages each substantially only at the high point 47 thereon. With this particular arrangement the weights have to do the least amount of work in expanding the spring with the result that the device is very sensitive, or responsive, to changes in speed of the apparatus. On the other hand, when the weights are in their outermost position, the spring 40 engages each over the entire arcuate portion 45 at the free end thereof so that when the speed of the apparatus falls below the predetermined value the spring acts efficiently and quickly to move the weights inwardly.

From the above description it will be readily understood that the safety shutter mechanism will operate in either direction of rotation of the shutter 23 so that it is adapted for use in both reverse and forward operations of a projector as well as during the projection of "stills." Furthermore, with the present arrangement the safety shutter per se, or the heat screen, can always move in the same direction from its operative position to its inoperative position, in this instance clockwise, irrespective of the direction of operation of the projector, so that there is no need for counter-balancing the safety shutter. Consequently, the undesirable pendulum action of counter-balanced safety shutters found in known arrangements when the safety shutter must be capable of movement in both directions from its operative position depending upon the direction of movement of rotation of the shutter shaft, or whether the apparatus is operating in the forward or reverse, is no problem with the present device.

It will also be apparent from the above description that the herein disclosed safety shutter possesses the advantage that under normal operating conditions there is no frictional contact between two relatively movable parts, as in known arrangements, with the result that wear and noise incident to said contact is eliminated. In addition, since the movement of the safety shutter between its two positions is positive in each instance, and not dependent upon frictional contact between two parts, such as a frictional clutch arrangement as is well known, the movement of the safety shutter between its two positions is smooth and definite and not jerky and subject to flutter.

While we have shown and described a specific embodiment of our invention, it will be readily appreciated that the number and arrangement of the parts could be varied without going beyond the scope of the present invention so long as the novel principles disclosed herein were retained; namely, that the safety shutter is normally moved to its inoperative position and adapted to be moved from said position by positive engagement of a centrifugally controlled member normally moved in a direction to engage and move said safety shutter from its normal position and adapted to be moved from engagement with said safety shutter when the apparatus is operated at or above a predetermined speed. While, for the purpose of simplicity and compactness, we have shown the weights mounted on the main shutter of the projector, it will be readily appreciated by one skilled in the art that these weights could be mounted on any rotating part of the apparatus the speed of which varies proportionally with the speed of movement of the film; e. g., a separate disc fixed to the shutter shaft in spaced relation to the shutter, etc.

Having thus described our invention, what we claim as new and desire to secure by Letters Patent of the United States is:

1. In a motion-picture apparatus having a projection aperture, the combination with a driven rotatable member, a safety shutter oscillatably mounted on said apparatus to move to and from an operative position wherein it covers said projection aperture, a spring normally tending to move said safety shutter from said operative position, a plurality of weights pivoted at one end to said rotatable member at points spaced from the axis thereof to move with said member and relative thereto due to the effect of centrifugal force, a spring normally forcing the free end of each of said weights toward the axis of said rotatable member to a position wherein they engage said shutter and move the same from its normal position, the free end of said weights adapted to move away from the axis due to centrifugal force when said rotatable member attains a predetermined speed and to an inoperative position wherein they are removed from engagement with said safety shutter.

2. In a motion-picture apparatus having a projection aperture, the combination with a driven rotatable member, a safety shutter oscillatably mounted on said apparatus to move to and from an operative position wherein it covers said projection aperture, a spring normally tending to move said safety shutter from said operative position, a plurality of weights pivoted at one end to said rotatable member at points spaced from the axis thereof to move with said member and relative thereto due to the effect of centrifugal force, a spring normally forcing the free end of each of said weights toward the axis of said rotatable member to a position wherein they engage said safety shutter and move the same from its normal position, the free end of said weights adapted to move away from the axis due to centrifugal force when said rotatable member attains a predetermined speed and to an inoperative position wherein they are removed from engagement with said safety shutter, and means for limiting the outward movement of the free end of said weights under the effect of centrifugal force.

3. In a motion-picture apparatus having a projection aperture, the combination with a driven rotatable member, a safety shutter pivoted eccentrically of the axis of said rotatable member to move to and from an operative position wherein it covers said projection aperture, means normally tending to move said shutter from said operative position, said safety shutter including a projecting portion surrounding and extending longitudinally of the axis of said rotatable member, a weight pivoted to said rotatable member eccentrically of the axis thereof to move therewith and relative thereto under the action of centrifugal force, a spring normally tending to move the free end of said weight toward the axis of said rotatable member and to a position wherein it engages said projecting portion of the safety shutter and serves to pivot said safety shutter from its normal position, said weight, when the rotatable member attains a predetermined speed, adapted to swing from the axis due to centrifugal force, and to a position wherein it disengages said safety shutter even when the latter is in its normal position.

4. In a motion-picture apparatus having a projection aperture, the combination with a driven rotatable member, a safety shutter pivoted eccentrically of the axis of said rotatable member to move to and from an operative position wherein it covers said projection aperture, means normally tending to move said shutter from said operative position, said safety shutter including a projecting portion surrounding and extending longitudinally of the axis of said rotatable member, a plurality of weights each pivoted at one end to said rotatable member in concentric relation to the axis thereof and adapted to move away from the axis of said rotatable member due to the effect of centrifugal force, a coiled spring embracing said weights and normally forcing the free ends thereof toward the axis of said rotatable member and into engagement with said projecting portion on said shutter to move the shutter from its normal position, said weights, when the rotatable member attains a predetermined speed, adapted to swing from the axis due to centrifugal force and to a position wherein it disengages said safety shutter even when it moves to its normal position.

5. In a motion-picture apparatus having a projection aperture, the combination with a driven rotatable member, a safety shutter pivoted eccentrically of the axis of said rotatable member to move to and from an operative position wherein it covers said projection aperture, means normally tending to move said shutter from said operative position, said safety shutter including a projecting portion surrounding and extending longitudinally of the axis of said rotatable member, a plurality of weights each pivoted at one end to said rotatable member in concentric relation to the axis thereof and adapted to move away from the axis of said rotatable member due to the effect of centrifugal force, a coiled spring embracing said weights and normally forcing the free ends thereof toward the axis of said rotatable member and into engagement with said projecting portion on said safety shutter to move the shutter from its normal position, said weights, when the rotatable member attains a predetermined speed, adapted to swing from the axis due to centrifugal force and disengage the safety shutter, and a stop on said rotatable member for limiting the outward movement of said weights in a position wherein they will not engage the safety shutter when the latter is in its normal position.

6. In a motion-picture apparatus having a projection aperture, the combination with a driven shutter shaft, a shutter fixed to said shaft to rotate therewith, a safety shutter pivoted to said apparatus eccentrically of said shutter shaft to move to and from an operative position wherein it covers said projection aperture, means normally tending to move said safety shutter from said normal position, a ring fixed to said safety shutter and encircling said shaft, said ring being sufficiently large to permit movement of said safety shutter between its two positions, a plurality of weights each pivotally mounted at one end to one side of the shutter in concentric relation to the shutter shaft and adapted to move away from said shaft due to the effect of centrifugal force, a coiled spring embracing said weights and normally forcing the free ends thereof toward said shaft and into engagement with said ring to move the safety shutter from its normal position, said weights, when the shutter attains a predetermined speed, adapted to swing away from the shutter shaft to release said ring, and stops on said shutter for limiting the outward movement of said weights in a position wherein they do not contact said ring when the safety shutter is in its normal position.

HENRY N. FAIRBANKS.
VERNON H. JUNGJOHANN.